United States Patent
Narasimhan

(10) Patent No.: US 7,369,269 B2
(45) Date of Patent: May 6, 2008

(54) PRINT TONER DENSITY MODE/PRINT MEDIA DEFAULT LINK

(75) Inventor: Sangeetha Narasimhan, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 953 days.

(21) Appl. No.: 09/726,966

(22) Filed: Nov. 29, 2000

(65) Prior Publication Data

US 2002/0063870 A1  May 30, 2002

(51) Int. Cl.
*B41J 29/38* (2006.01)
*B41J 2/135* (2006.01)
*G06K 1/00* (2006.01)

(52) U.S. Cl. .............. 358/1.9; 358/1.2; 358/1.13; 347/5; 347/6; 347/254; 347/20; 347/44; 399/82; 399/84; 399/85; 399/57

(58) Field of Classification Search .............. 358/1.9, 358/1.2, 1.13–1.16; 345/589, 590; 347/131, 347/188, 251, 14, 106, 5, 6, 16, 254, 20, 347/44, 84; 399/45, 82, 85, 393, 55, 57, 399/61
See application file for complete search history.

(56) References Cited

U.S. PATENT DOCUMENTS

| | | |
|---|---|---|
| 5,231,452 A | 7/1993 | Murayama et al. |
| 5,457,549 A | 10/1995 | Kumada et al. |
| 5,473,351 A | 12/1995 | Helterline et al. ............. 347/19 |
| 5,483,625 A | 1/1996 | Robertson et al. ........... 395/117 |
| 5,751,433 A | 5/1998 | Narendranath et al. |
| 5,751,434 A * | 5/1998 | Narendranath et al. ...... 358/1.9 |
| 5,809,367 A * | 9/1998 | Yoo et al. ..................... 399/45 |
| 5,845,171 A | 12/1998 | Ko |
| 5,852,462 A * | 12/1998 | Lloyd et al. ................. 347/156 |
| 5,971,519 A * | 10/1999 | Horikoshi ..................... 347/16 |
| 6,048,116 A * | 4/2000 | Kumada ........................ 400/76 |
| 6,104,829 A * | 8/2000 | Nakajima .................... 382/167 |
| 6,189,993 B1 * | 2/2001 | Mantell ........................ 347/15 |
| 6,291,829 B1 * | 9/2001 | Allen et al. ............. 250/559.07 |
| 6,343,846 B1 * | 2/2002 | Asano ........................ 347/14 |
| 6,364,452 B1 * | 4/2002 | Noyes et al. ................. 347/43 |
| 6,424,429 B1 * | 7/2002 | Takahashi et al. .......... 358/1.16 |
| 6,457,794 B1 * | 10/2002 | Tajika et al. ................... 347/11 |
| 6,511,148 B1 * | 1/2003 | Colombi et al. .............. 347/19 |
| 6,654,143 B1 * | 11/2003 | Dalal et al. .................. 358/1.9 |
| 6,705,717 B1 * | 3/2004 | Fujita et al. ................ 347/106 |

FOREIGN PATENT DOCUMENTS

JP     10202969 A  *  8/1998

* cited by examiner

*Primary Examiner*—David Moore
*Assistant Examiner*—Chan S Park

(57) ABSTRACT

A method for automatically selecting a print job parameter including the steps of ascertaining a first print job parameter and automatically selecting a second print job parameter based upon the first print job parameter. In one embodiment the method includes the steps of automatically ascertaining a pre-selected toner density setting and automatically selecting a print media based upon the pre-selected toner density setting. Alternately, the method for automatically selecting a print job parameter may include the steps of ascertaining a pre-selected print media and automatically selecting a toner density setting based upon the pre-selected print media.

4 Claims, 2 Drawing Sheets

PRINT TONER DENSITY MODE/PRINT MEDIA DEFAULT LINK

FIELD OF THE INVENTION

The present invention relates generally to printing, and more particularly, to a method for selecting a print media dependant upon a pre-selected toner mode default setting.

BACKGROUND

Imaging devices, including printers, copiers and various multi-function imaging devices, select and feed print media from an input source, commonly a media tray. The selection of a media source is commonly based upon a pre-selected default. For instance, a single print media tray printing device may be configured to select and feed print media from the single print media tray if and only if there is no media present in a manual feed port. A primary default for print media, in this situation, is for manual feed. In the case of a multiple print media tray printing device the primary default for print media may be for manual feed with a secondary default being for selection and feed of print media from the first print media tray and a tertiary default from a second print media tray and so on. In the event the first print media tray is empty, the imaging device controller will automatically choose the second print media tray regardless of the type of media loaded in the tray.

It may be undesirable for an imaging device to select, by default, a relatively high cost media in the event that a draft document is being printed for draft purposes.

It has previously been recognized that in situations in which a draft document is desired, it may be relatively more economical to print such documents employing a "draft toner mode". In a draft toner mode, the toner density of printed documents may be varied by adjusting toner density level in order to obtain a desired draft toner density. Methods and apparatus for adjusting the density of digital imagery are known in the prior art.

U.S. Pat. No. 5,483,625 to Robertson et al., is directed to methods and apparatus for the economical use of toner or ink in high resolution printers which includes adjusting the density of digital imagery.

U.S. Pat. No. 5,473,351 to Helterline, et al., is directed to a method and apparatus for regulating ink-jet printer print density to optimize resolution.

It would be desirable to provide a method for automatically selecting, or automatically changing, the default selection for a print media dependant upon a pre-selection of a toner mode setting. In particular, it would be desirable to provide a method for automatically selecting, or automatically changing the default selection to a draft media dependant upon the pre-selection of a draft toner mode setting. In addition, it would be desirable to provide a method for automatically selecting, a toner density setting dependant upon a pre-selection of a print media default setting. In particular, it would be desirable to provide a method for automatically selecting, or automatically changing the default selection to a draft toner density setting dependant upon the pre-selection of a draft print media default setting.

SUMMARY

The present invention is directed to a method for automatically selecting a print job parameter including the steps of ascertaining a first print job parameter and automatically selecting a second print job parameter based upon the first print job parameter. In one embodiment the method includes the steps of automatically ascertaining a pre-selected toner density setting and automatically selecting a print media based upon the pre-selected toner density setting. Alternately, the method for automatically selecting a print job parameter may include the steps of ascertaining a pre-selected print media default and automatically selecting a toner density setting based upon the pre-selected print media default.

The present invention provides a method wherein imaging devices, including printers, copiers and various multi-function imaging devices, which employ broadly the devices and methods of electrophotographic imagery or inkjet imagery may automatically recognize a first print job parameter and select a second print job parameter based upon the first print job parameter.

Imaging devices which employ electrophotographic imagery commonly include a print engine, a printer controller, a formatter and an input for receiving data to be printed. In a document printer such as a laser printer, toner is delivered to a photoconducting drum to form an intermediate or latent image. The photoconducting drum is electrostatically charged and exposed to an image, which selectively discharges regions on the charged drum. The image is developed by delivering electrostatically charged toner particles to the surface of the drum where the opposing charged particles adhere to charged surface areas. The toner image on the drum is transferred to a print media which is fed across the drum by a print media feed mechanism. Following transfer of the latent image to the print media, the toner is thermally fused to the print media to create the image.

The printer controller provides control for the print engine and an interface to the print engine. The printer controller may control various printer functions including rasterization of image data, actuation and operation of the print media feed mechanism and actuation and operation of the print engine. The printer controller modulates the laser for photoconductor exposure and sets the relative bias voltages and fuser temperatures. Additionally, the printer controller may monitor the status of the various printer functions, operation parameters and components. In addition and according to the present invention, the printer controller also may control selection of a print media default and a toner density setting.

Imaging devices, including printers, copiers and various multi-function imaging devices, which employ broadly the devices and methods of inkjet imagery commonly employ an inkjet printer carriage mounted for movement transversely to a media feed direction. Print media may be manually fed or drawn from a print media storage cassette by a print media feed mechanism through the printer and across a roller in media feed direction. A printer controller may control various printer functions including rasterization of image data, actuation and operation of the print media feed mechanism and actuation and operation of the printer carriage and print head. In addition and according to the present invention, the printer controller also may control selection of a print media default and a toner density setting.

In one preferred embodiment of the invention, in the event that an operator selects a draft or economy toner density setting, either at the imaging device or at a connected computing device, such as a personal computer, the printer controller selects a print media default for a draft media from a draft media storage cassette and the print job continues. Alternately, in the event that an operator selects a draft media default setting, either at the imaging device or at a connected computing device such as a personal computer, the printer controller selects a draft toner density setting based upon the pre-selected print media default and the print job continues. In the event that draft media is not present, the printer controller may signal the user that the draft media cassette or other source requires replenishment prior to completion of the print job. In the alternative, the print job may continue by selecting the next following hierarchical default.

DESCRIPTION

Figure 1:
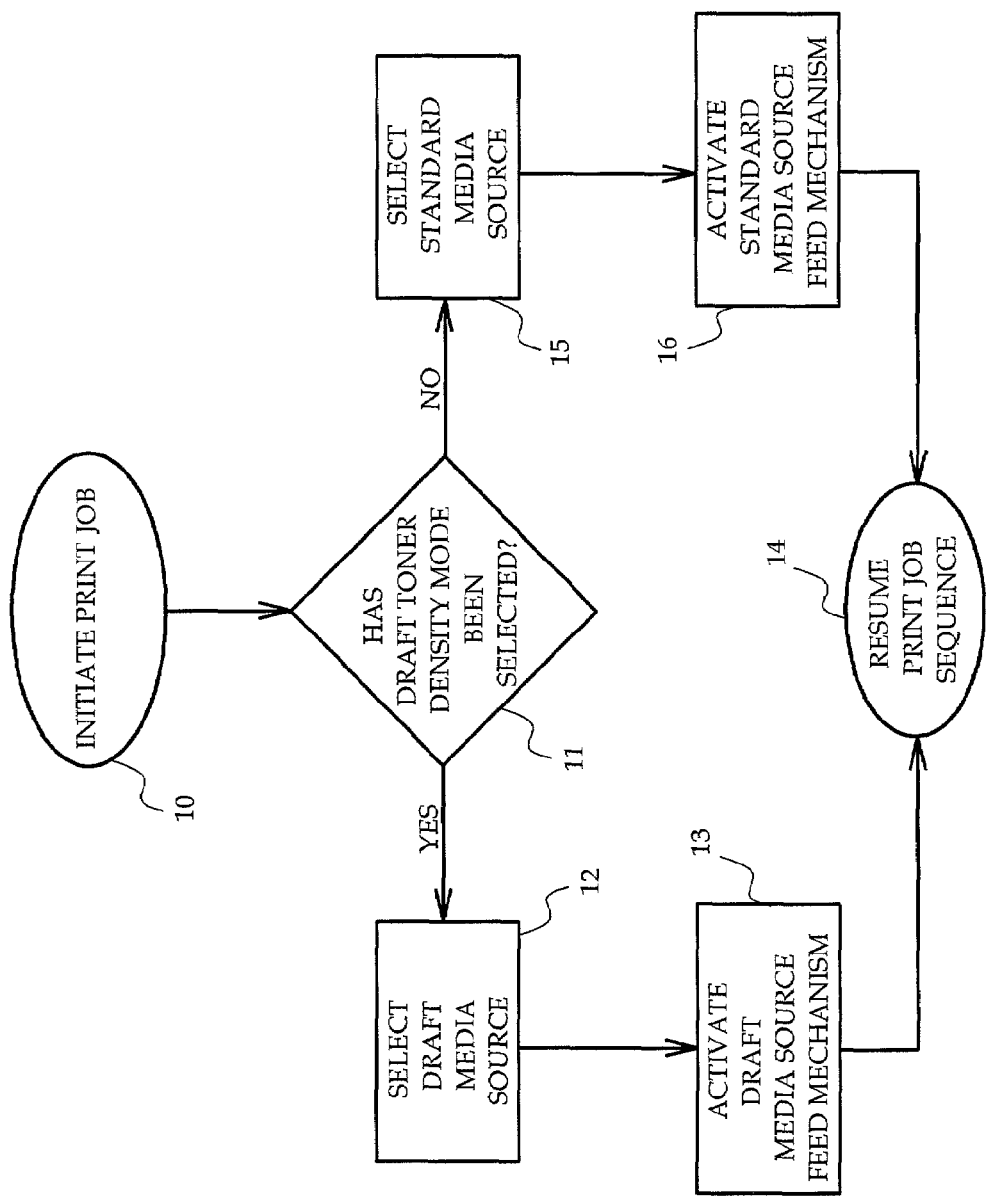
FIG. 1 is a flow chart depicting a method for automatically selecting a print job parameter.
Figure 2:
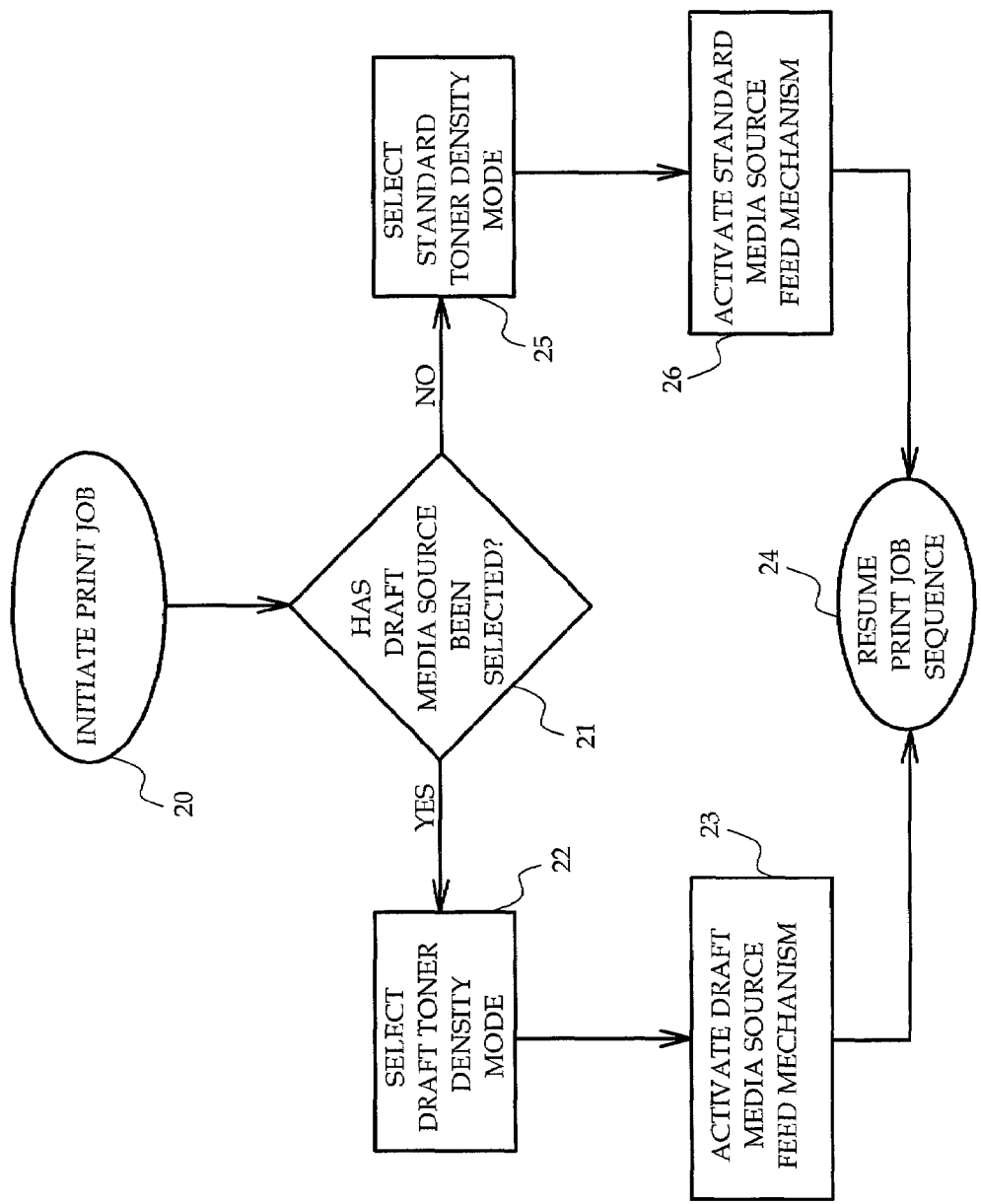
FIG. 2 is a flow chart depicting a method for automatically selecting a print job parameter.

Referring to FIGS. 1 and 2, a method for automatically selecting a print job parameter is more completely described. Referring to FIG. 1, the method for automatically selecting a print job parameter is shown generally including the step of initiating a print job at "Initiate Print Job" 10 followed by ascertaining the toner density mode at "Has Draft Toner Density Mode Been Selected?" 11. If draft toner density mode has been selected then the method proceeds to "Select Draft Media Source" 12. Once the draft media print source has been selected, "Activate Draft Media Source Feed Mechanism" 13 activates the draft media source feed mechanism to draw draft media through the imaging device. Following activation of the draft media source feed mechanism, the process continues at "Resume Print Job Sequence" 14.

In the event that draft toner density mode has not been selected, the method proceeds to "Select Standard Media Source" 15. Once the standard media print source has been selected, "Activate Standard Media Source Feed Mechanism" 16 activates the standard media source feed mechanism to draw standard media through the imaging device. Following activation of the standard media source feed mechanism, the process continues at "Resume Print Job Sequence" 14.

FIG. 2 depicts another preferred embodiment of the invention. A method for automatically selecting a print job parameter is shown generally including the step of initiating a print job at "Initiate Print Job" 20 followed by ascertaining the toner density mode at "Has Draft Media Source Been Selected?" 21. If draft media source has been selected then the method proceeds to "Select Draft Toner Density Mode" 22. Once the draft toner density mode has been selected, "Activate Draft Media Source Feed Mechanism" 23 activates the draft media source feed mechanism to draw draft media through the imaging device. Following activation of the draft media source feed mechanism, the process continues at "Resume Print Job Sequence" 24.

In the event that draft media source has not been selected, the method proceeds to "Select Standard Toner Density Mode" 25. Once the standard toner density mode has been selected, "Activate Standard Media Source Feed Mechanism" 26 activates the standard media source feed mechanism to draw standard media through the imaging device. Following activation of the standard media source feed mechanism, the process continues at "Resume Print Job Sequence" 24.

While this invention has been described with reference to the detailed embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. A method for selecting a print job parameter including the steps of:
   a printer controller ascertaining an operator-selected draft toner density setting; and
   the printer controller automatically selecting a draft print media source based upon the operator-selected toner density setting.

2. A method for selecting a print job parameter including the steps of:
   a printer controller ascertaining an operator-selected draft print media source setting; and
   the printer controller automatically selecting a draft toner density setting based upon the operator-selected print media source setting.

3. A printer controller configured to:
   automatically recognize a selection of a draft toner density setting; and
   in response to recognizing the selection of the draft toner density setting, automatically select a source of draft print media.

4. A printer controller configured to:
   automatically recognize a selection of a source of draft print media; and
   in response to recognizing the selection of a source of draft print media, automatically select a draft toner density setting.

* * * * *